(12) United States Patent
Dacus

(10) Patent No.: US 7,854,204 B2
(45) Date of Patent: Dec. 21, 2010

(54) ULTRALIGHT UNIT LOAD DEVICE

(76) Inventor: Walter Dacus, Dendermondsetoenweg 56, 9260 Scheilebelle (BE)

( * ) Notice: Subject to any disclaimer, the term of this patent is extended or adjusted under 35 U.S.C. 154(b) by 530 days.

(21) Appl. No.: 11/871,462

(22) Filed: Oct. 12, 2007

(65) Prior Publication Data

US 2009/0095206 A1 Apr. 16, 2009

(51) Int. Cl.
B65D 19/38 (2006.01)

(52) U.S. Cl. .................. 108/55.5; 108/51.3

(58) Field of Classification Search .......... 108/51.3, 108/51.11, 55.5, 27, 55.1, 55.3
See application file for complete search history.

(56) References Cited

U.S. PATENT DOCUMENTS

| | | | |
|---|---|---|---|
| 3,428,002 A | 2/1969 | McIntire, Jr. et al. | |
| 3,452,958 A | 7/1969 | Hambleton | |
| 3,509,832 A | 5/1970 | Daisley, Jr. | |
| 3,591,121 A | 7/1971 | Parris | |
| 3,622,114 A | 11/1971 | McIntire, Jr. | |
| 4,336,292 A * | 6/1982 | Blair | 428/116 |
| 4,404,889 A * | 9/1983 | Miguel | 428/118 |
| 4,803,108 A * | 2/1989 | Leuchten et al. | 428/118 |
| 5,106,668 A | 4/1992 | Turner et al. | |
| 5,139,845 A | 8/1992 | Beckerman et al. | |
| 5,284,098 A | 2/1994 | Klapperich et al. | |
| 5,443,884 A | 8/1995 | Lusignea et al. | |
| 5,460,865 A * | 10/1995 | Tsotsis | 428/118 |
| 5,567,500 A * | 10/1996 | Marshall et al. | 428/118 |
| 5,667,566 A | 9/1997 | Flynn et al. | |
| 5,667,866 A * | 9/1997 | Reese, Jr. | 428/118 |
| 5,809,901 A * | 9/1998 | Gutzmer | 108/27 |
| 5,823,724 A * | 10/1998 | Lee | 410/104 |
| 5,900,203 A | 5/1999 | Needham et al. | |
| 5,981,025 A | 11/1999 | Marshall et al. | |
| 6,025,047 A * | 2/2000 | Catta et al. | 108/27 |
| 6,054,200 A * | 4/2000 | Woods | 428/118 |
| 6,117,518 A | 9/2000 | Cawse et al. | |
| 6,117,519 A | 9/2000 | Burns | |
| 6,308,642 B1 | 10/2001 | Branam et al. | |
| 6,440,257 B1 | 8/2002 | Zhou et al. | |
| 6,655,299 B2 | 12/2003 | Preisler et al. | |
| 6,852,192 B2 | 2/2005 | Sato et al. | |
| 6,871,725 B2 * | 3/2005 | Johnson | 428/116 |
| 7,100,871 B2 * | 9/2006 | Assler et al. | 244/117 R |
| 7,455,017 B2 * | 11/2008 | Carpenter et al. | 108/51.11 |
| 2005/0132937 A1 * | 6/2005 | Branam | 108/55.5 |
| 2006/0008611 A1 | 1/2006 | Shen et al. | |

OTHER PUBLICATIONS

Frank J. Filippi, Honeycomb Sandwich Fixtures at 2000F, American Society of Tool and Manufacturing Engineers, Technical Paper EM58-301 (1958), pp. 1-8.

(Continued)

*Primary Examiner*—José V Chen
(74) *Attorney, Agent, or Firm*—Notaro, Michalos & Zaccaria P.C.

(57) ABSTRACT

An ultralight unit load device has a ruggedized quadrangular composite structure with a cellular load-bearing core sealed in successive ordered-polymer stiffening plies and trimmed at the outer edges with a hollow, multi-chambered profile of lightweight material fixed with a flush attachment member so as to present a flat surface for easy loading and unloading.

21 Claims, 5 Drawing Sheets

OTHER PUBLICATIONS

Pieter Van Dine, Cost Effective Composite Processing, Society of Manufacturing Engineers Conference on Composite Manufacturing & Tooling Feb. 21-23, 2001 Orlando FL: Technical Paper EM02-110, pp. 1-14.

Alcan Singen GmbH, Aviation Products Product Catalogue (Jul. 2002), pp. PA-01 thru PA-07.

Euro-Composites, Aluminum Honeycomb Core Technical Data Sheet for All Types, EC 53.

HexPly 920 Product Data, Publication No. FTA056c (Mar. 2007), Hexcel Corporation, Southbury, CT pp. 1-4.

Redux 319 Product Data, (Aug. 2005), Hexcel Corporation, Southbury, CT pp. 1-4.

3003 Aluminum Honeycomb, Technical Datasheet, Composite Materials Limited, Cheshire, UK.

463L Air Cargo Pallet HCU-6/E Product Specification, Rev. A 1-07, AAR Mobility Systems, Cadillac, MI.

Toolmaster Product Catalog, (May 24, 2007), Airtech Advanced Materials Group, Huntington Beach, CA pp. 1-41.

* cited by examiner

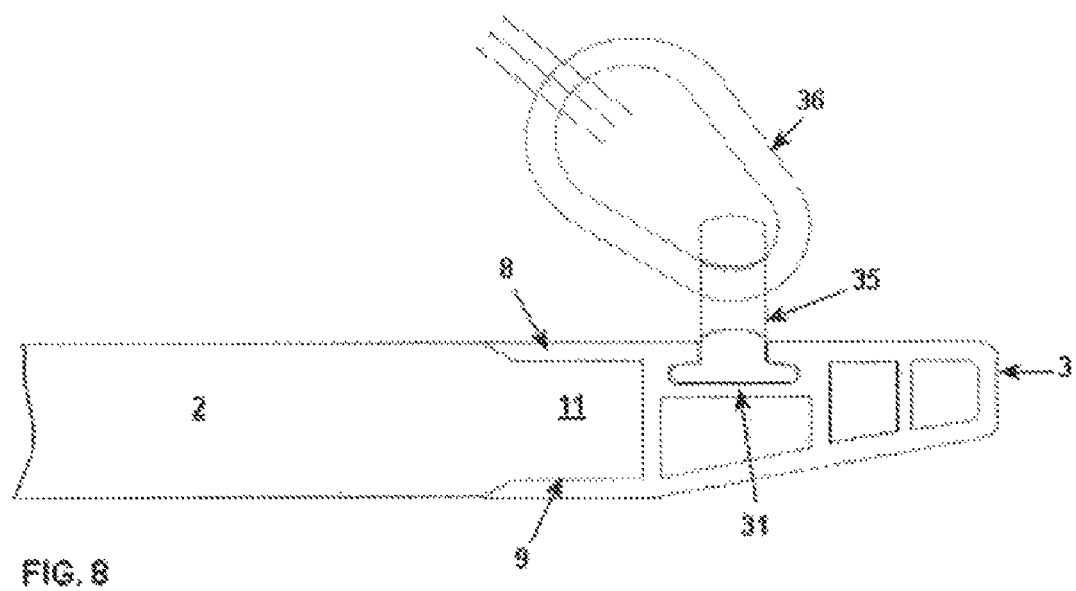
FIG. 8
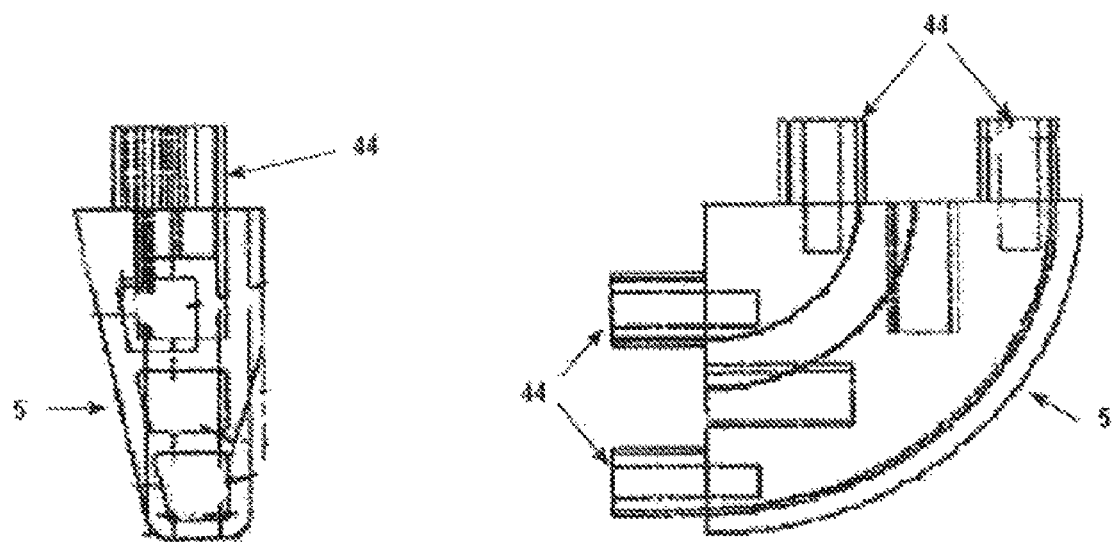
FIG. 9a
FIG. 9b

ULTRALIGHT UNIT LOAD DEVICE

FIELD AND BACKGROUND OF THE INVENTION

The present invention relates generally to the field of ultralight unit load devices such as air cargo pallets and in particular to a ruggedized quadrangular composite structure with a cellular load-bearing core sealed in successive ordered-polymer stiffening plies and trimmed at the outer edges with a hollow, multi-chambered profile of lightweight material fixed with flush head rivets so as to present a flat surface for easy loading and unloading of payloads.

The loading of air freight within the cargo compartment of an aircraft typically involves the use of pallets, available in a variety of different sizes, which are disposed in the aircraft and are otherwise designed to support and retain cargo thereon. A primary benefit to the use of such pallets is the ability to load a large volume of smaller items at one time, after they have been pre-loaded on the pallet at a remote location. Moreover, the pallet functions to maintain the items securely and uniformly retained on the aircraft. In particular, the supported load is typically maintained in its intended position on the pallet by means of some type of retaining cover or structure, specifically designed to allow the maximum load to be placed on each pallet, while at the same time assuring that the loaded cargo will not shift or be inadvertently displaced from the pallet during take-offs, landings or during the actual in-flight maneuvers of the aircraft.

Current air cargo pallets are composed of solid sheets of high strength, lightweight metals such as aluminum sheets typically weighing in the range of 96 to 138 kg or greater for at least an 88×125 inch dimension, depending on configuration and material and teach a base sheet thickness of 0.2 inches or less. See, for instance, the air cargo pallets sold as product nos. 081203 and 081244 by Alcan Singen GmbH, as product no. 463L by MR mobility systems, and U.S. Pat. No. 6,308,642 to Branam et al. ("Pallet Assembly") and U.S. Pat. No. 5,284,098 to Klapperich et al. ("Air Cargo Pallet"). As weight is a principle concern in the aviation industry, any advancement in the design of such pallets that can reduce the overall weight while maintaining load-bearing capacity and structural integrity would be welcomed.

The light-metal base plate of an air cargo pallet cannot insure heavy-load carrying capability by itself without being prone to deformation. Therefore, such pallets are typically fitted with light-metal hollow profile edges primarily designed to have an enhancing effect on the load-carrying capability of the pallet by allowing for flexible and elastic deformation in response to impact, alternating and continuous loads and related strain.

The light-metal hollow profiles also have another function due to their flat outer edges. Many air and land transport vehicles and storage facilities are equipped with holding systems designed to receive air cargo pallets along their flat outer edges. In this way, the pallets are prevented from tilting during inclined positions, accelerations or decelerations. Typically, these hollow profiles are also constructed with upwardly open T-shaped longitudinal slots designed to accept mushroom or plunger shaped heads for securing payload by means of stretching nets and the like. These T-shaped slots are well known in the prior art and are typically designed so that the narrowed portions at the edge of the slots used to retain said mushroom or plunger heads are raised in elevation above the plane of the light-metal hollow profile. Examples of this design can be found at FIG. 3 of U.S. Pat. No. 5,284,098 to Klapperich et al. ("Air Cargo Pallet") and FIGS. 5 and 6 of U.S. Pat. No. 6,308,642 to Branam et al. ("Pallet Assembly"). The raised profile of these constructions prohibit the free sliding movement of payloads, increasing the amount of time it takes to load and unload cargo and, commensurately, the costs of transport.

Along the bottom, inner margins of above said light-metal hollow profiles is usually a step-like shoulder into which the light-metal plate is inserted so that at the bottom it is flush with the light-metal hollow profile and riveted together. This construction is designed to counteract the shear strain acting at the level of the light-metal plate. Reference again is made to FIG. 3 of U.S. Pat. No. 5,284,098 to Klapperich et al. ("Air Cargo Pallet") and FIGS. 5 and 6 of U.S. Pat. No. 6,308,642 to Branam et al. ("Pallet Assembly") and the air cargo pallets sold as product nos. 081203 and 081244 by Alcan Singen GmbH. As in the instance of the slots mentioned above, the raised profile of this shoulder construction prohibits the free sliding movement of payloads, increasing the amount of time it takes to load and unload cargo and the commensurate costs. There is a long-felt need in the aviation industry for a solution that will reduce the logistical costs and complexities of payload movement without sacrificing the payload capacity and structural integrity of air cargo pallets.

The rigors of air transportation demand a highly durable pallet construction that is resistant to deformation to prevent the shifting of weight during flight and can withstand an abusive regimen of loading and unloading of payload under severe time constraints and in less than ideal conditions. There is, therefore, a long-felt need in the aviation industry for the construction of low maintenance, safe, ruggedized pallets.

Pallets such as those sold by Alcan Singen GmbH as product nos. 801237 and 801238 are heavy, deformable and have an elevated edge.

Therefore, a need exists for a durable, lightweight, unit loading device with a flat profile that meets aviation industry specifications such as that set forth in National Aerospace Standard (NAS) 3610.

SUMMARY OF THE INVENTION

It is an object of the invention to confer a lightweight, non-deformable unit load design that meets aviation industry standards without sacrificing payload capacity.

It is another object of the invention to provide a unit load design with a flat top profile for reducing the complexities of payload movement and the costs associated with cargo transportation without sacrificing payload capacity and structural integrity.

It is a further object of the invention to provide a durable structure that is resistant to impact damage and deformation with a multi-chambered open-structured edge profile that allows for elastic deformation in response to varying load conditions with minimal shear strain at the base plate intersection and is easy to replace when necessary.

Accordingly, an ultralight unit load device is disclosed comprising of a base panel and an edge structure. The panel portion of the preferred embodiment is essentially a reinforced and sealed composite panel assembly with a cellular sandwich core. The layered construction of the panel portion consists of an ultralight, microperforated, cellular corepanel (such as an aluminum honeycomb), layered with adhesive film to bond successive layers to the corepanel, followed by successive layers of unidirectional prepreg layers in varying directions (composed of materials selected for their stiffness and strength-to-weight ratios such as carbon fibers), and at least one outer sealant layer acting as a wear surface and composed of a durable material such as aramid prepreg.

Prepreg is a term of art used in the composite materials industry to identify mat, fabric, nonwoven material or roving which has been preimpregnated with resin and which is ready for final curing.

Composites are generally an assembly of dissimilar materials that work together to perform a function only possible in the composite form.

Generally, composites include a resin matrix with a fiber reinforcement material.

The use of honeycomb core materials for constructing lightweight panels or sandwich structures is well established in the aeronautical and spacecraft fields. For example, in commercial aircraft, nearly all of the movable control surfaces, wing and tail leading and trailing edge fixed surfaces, doors, and interior cabin structures employ panels formed of honeycomb cores. Such prior art cores have typically been constructed of an aluminum or aramid paper honeycomb. Although more expensive than simple structures, the honeycomb core panel possess equal strength at higher stiffness, lower weight, and is resistant to higher natural vibration frequencies.

The edge structure comprises a multi-chambered, open-structure lightweight material edge designed to allow for elastic deformation response to a variety of load conditions and related strains while introducing minimal strain at the area where the edge structure is attached to the base plate. The edge structure presents a flat top profile, devoid of the a protruding shoulder, attached to the base plate with flush head rivets, or other attachment means, and machined with a plurality of with longitudinal T-shaped rigging slots also flush with the top surface.

The various features of novelty that characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 8 is a fragmentary, sectional, side view of the unit base and attached edge component employed with anchoring means;

FIG. 9a is a sectional, side view of a corner section part;
FIG. 9b is a top view of a corner section part.

DESCRIPTION OF THE PREFERRED EMBODIMENTS

Figure 1:
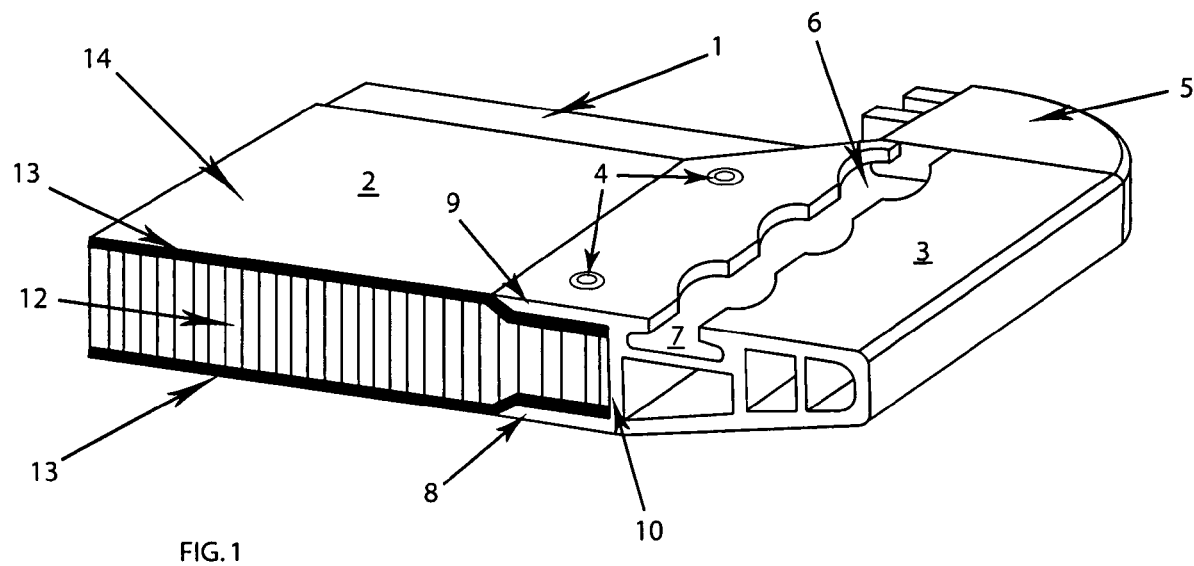
FIG. 1 is a fragmentary, sectional, isometric view of a completed unit loading device assembly showing both the unit base and the edge attachment.

Referring now to the drawings, in which like reference numerals are used to refer to the same or similar elements, FIG. 1 shows a fragmentary, sectional, isometric view of the completed unit loading device assembly with reference number I designating a unit loading device constructed in accordance with the teachings of this invention. As seen from FIG. 1, the unit loading device 1 generally comprises of a unit base 2 and an at least one, but preferably a plurality of edge components 3 along each longitudinal and traverse edges of the unit base 2 and substantially equivalent to the length of the side of the unit base 2, although not necessarily so. In one embodiment of this invention, the edge component 3 is attached to the unit base 2 by attachment means such as a flush head rivet (not shown) at a plurality of apertures 4 in the edge component 3. Interconnecting the adjacent edge components 3 are corner sections 5 which will be discussed in further detail below. The edge component 3 is constructed so that it forms a track 6 that contains a plurality of T-shaped apertures 7 designed to accept anchoring elements (not shown).

In the preferred embodiment of the present invention, the edge component 3 includes flanges 8 and 9 interconnected by a web 10, preferably integral with the remainder of the edge component 3, designed to embrace the marginal portion of the unit base 11. The marginal portion of the unit base 11 is narrowed with respect to the main body of the unit base 2 so as to fit between the flanges 8 and 9 of the edge component 3 in such a manner that the peripheral surface of the unit base 2 is flush with the edge component 3 so as to form a smooth, uninterrupted, flat surface. The marginal portion of the unit base 11 terminates short of and abuts against the web 10.

Figure 2:
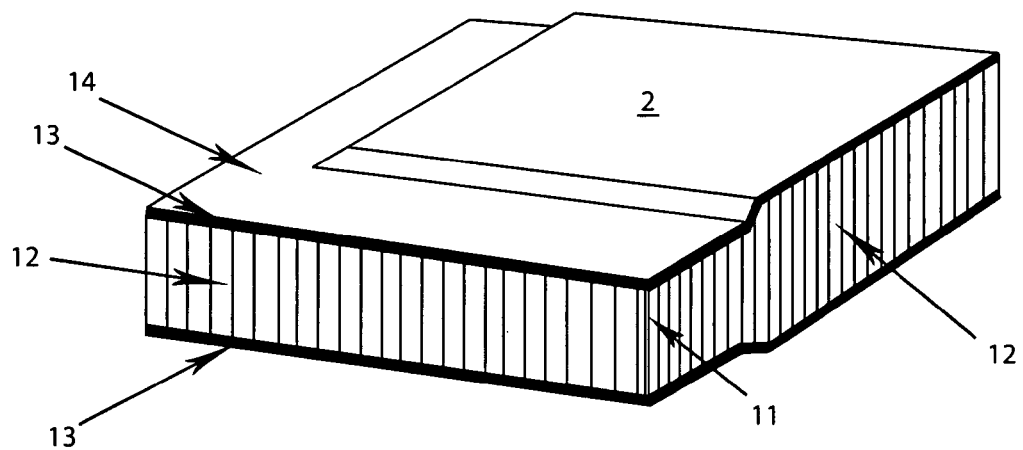
FIG. 2 is a fragmentary, sectional, isometric view of the unit base.

The unit base 2 is a composite structure as shown in FIGS. 1 and 2 and as discussed in more detail below. Generally, the unit base 2 comprises a quadrangular composite structure with a cellular load-bearing core 12 sealed in successive, ordered-polymer, stiffening plies 13 and, at least one, final layer 14 of aramid or similar wear-resistant material.

Unit Base Material

The cellular load-bearing core 12 core must have small enough cell sizes to provide stabilization of the facings against premature buckling and must be sufficiently tough and abuse resistant to enable the same to be easily handled in a fabrication shop. The solid or hollow, closed cells of the cellular load-bearing core 12 can be made in any variety of shapes such as cylindrical, spherical, rectangular, triangular, square or octagonal; however, the hexagonal "honeycomb" structure is the preferred design. Exemplary honeycomb materials include aluminum, aramide, carbon or glass fiber composite materials, resign impregnated papers and the like. Aramid honeycombs are used where high damage tolerance and abuse resistance is a criteria. However, Aramid honeycombs lack the shear and compressive strength of aluminum honeycombs; therefore, aluminum is presently the preferred core material for minimum weight primary structures in spacecraft and aircraft. Reference is made in this regard to treatises entitled "Composite Basics", second edition by A. Marshall; International Encyclopedia of Composites, Volume 1, pgs. 488-507, Lee; Handbook of Composites, chapter 21, G. Lubin; and the Society of Material Engineers Technical Paper EM58-301 entitled "Honeycomb Sandwich Fixtures at 2000F" which are incorporated herein by reference. Product brochures entitled "CR III", Hexcel Corp. (Stamford, Conn.), "3003 Aluminum Honeycomb", Composite Materials Ltd. (Cheshire, UK), and Nida, Nidatran, Dura-Core II and PAA-Core, M.C. Gill, Corp. (El Monte, Calif.), describe various applicable honeycomb cores in detail. Although dimensions may be varied widely, it is preferred that the cellular load-bearing core 12 be constructed of microperforated, closed, hexagonal cells of corrosive-resistant aluminum, preferably 5056 H3 Alloy, with ⅛ inch (0.31 cm) cores and a density range from 1 to 9 lb/cf with a preferred density of 9.1 lb/cf. While the thickness of the cellular load-bearing core 12 may itself vary, the preferred maximum overall thickness of the unit base 2 composite is 1 inch. It is the intent and scope of this invention to cover all reasonable ranges of thickness for honeycomb core composites as taught by the relevant art; however, the use of honeycomb core resulting in overall composite unit base 2 dimension less than 1 inch thick will require a more compact honeycomb matrix to maintain the same load-bearing capacity and therefore a greater overall weight for the unit load device 1. An Exemplary aluminum honeycomb core product is the aluminum core sold as product number CR III-1/8-5056-002P8.1 by Hexcel Corp (Stamford, Conn.).

With respect to the successive layers of stiffening plies 13 seen in FIGS. 1 and 2, the fibers of said plies 13 may be constructed of aromatic polyamide (aramid), carbon fiber, ceramic, boron, or any other materials having a very small diameter and high strength and stiffness. Such ordered-polymer unidirectional plies are well known in the art have been used in layup processes for the fabrication of aeronautical structures such as wing skins and solar arrays in satellites. Lack of transverse integrity limits formation of core structures from existing unidirectional plies, ie; they are delicate and prone to splitting along the side-by-side fibers. Thus, such unidirectional fabric or fiber plies are best applied as layers in different directions to confer rigidity along different axes.

In the preferred embodiment, the procedure for applying the successive stiffening plies 13 to cellular load-bearing core 12 involves forming a prepreg sheet which includes at least one fabric or fiber layer and an uncured prepreg resin. An adhesive is applied to the prepreg and it is then bonded to the honeycomb by curing of both the prepreg resin and a layer of adhesive resin at elevated temperature. Resins may typically consist of an epoxy, polycyanate, bismaleimide, and the like. While a variety of different fabrics, fibers and resins can be used (as discussed above), the stiffening plies 13 in the preferred embodiment are comprised of unidirectional carbon fiber fabric in an epoxy resin, or carbon prepreg with a preferred carbon fiber density in the range of 184 to 232 g/m$^2$, a preferred epoxy resin density in the range of 79 to 99 g/m$^2$, constituting a preferred percentage of 30±2% of overall ply weight, both together constituting an overall density in the preferred range of 263 to 331 g/m$^2$, and a preferred thickness in the range of 0.166 to 0.211 mm. The carbon prepreg of the preferred embodiment cures at approximately 125° C. Exemplary embodiments of the preferred carbon prepreg are those sold as product numbers 46H184NSD, 46J230NSD and 65H250NSD by You Chang Co., Ltd. (Seoul, KR). A formula for predictive calculation of fiber volume determination is well known in the art and can be used to modify the parameters discussed above to accommodate varying dimensions and load-bearing properties of the unit base 2. As a reference please see the Society for Manufacturing Engineers Technical Paper No. ID 1048 entitled "Low Cost Composite Fabrication: Vacuum Assisted Resin Infusion" by Ser Ming Chia et al. (2001) which is incorporated by reference herein.

The adhesive film used in the process of fabricating the unit base 2 must be appropriate for such applications as aluminum to aluminum bonding, fiber-reinforced composite to composite bonding, aluminum honeycomb sandwich bonding and aramid honeycomb sandwich bonding. Such adhesive file must also have good performance temperatures ranging from −55° C. to 150° C., good drape at ambient temperatures, excellent peel properties and ideally have less than 1% volatile content. In those instances where the prepreg is bonded without using a separate adhesive (i.e., the prepreg is self-adhesive), the prepreg resin must meet the dual requirements of being suitable for preimpregnating the fiber layer while still providing adequate adhesion to the honeycomb. In the preferred embodiment, the adhesive film layer comprises a modified epoxy film, which cures at about 175° C. (350° F.) and has a preferred areal weight range of 0.03 to 0.08 psf. An exemplary adhesive film is sold under the trade name Redux 319 by Hexcel Corp., (Stamford, Conn.).

An alternate embodiment that could be employed to reduce the weight of the structure is to use face sheets from composite materials that are self-adhesive. Exemplary self-adhesive face sheets are described in published European Patent Applications Nos. EP0927737 A1 and EP0819723 A1 and are incorporated herein by reference.

Along with the stiffening plies 13 the preferred embodiment of the present invention also comprises at least one, final wear surface layer 14 for ruggedizing the unit base 2. While a number of resins and fibers are appropriate for this application, the preferred final wear surface layer 14 consists of an aramid fibers (Kevlar 4H satin) at a density of approximately 171 g/m$^2$ in an advanced resin matrix suitable for low to medium pressure laminating and molding with a curing condition of 1 hour at 125° C. and 300 kN/m$^2$ pressure. An exemplary final prepreg layer is sold as HexPly 920KX-285-52% by Hexcel, Corp. (Stamford, Conn.).

Composite Panel Manufacturing Process

Composite manufacturing processes available today include wet hand lay-up, vacuum assisted resin transfer molding (VARTM), pultrusion, filament winding, and autoclave cure. These processes vary in capabilities and cost and all may be used in constructing the present invention. However, the preferred method of manufacture is by vacuum thermoforming, Vacuum forming is a thermoforming process that involves forming composite layers into three-dimensional shapes through the application of heat and pressure. In a vacuum molding system a mold, often made of fiberglass or aluminum, is polished, waxed, and treated with a release agent before the fabric and resin are applied and the vacuum is pulled allowing the piece to cure (harden) under applied heat and pressure. The various layers disposed in the mold are pressed in the mold by evacuating the air. Such evacuation serves to press the materials against the die, punch or composite structure, and to remove surplus resin. The desired shape is thus obtained with the fibers being impregnated with the resin as well as possible.

There are a number of ways to apply the resin to the fabric in a vacuum mold. One is called a wet layup, where the two-part resin is mixed and applied before being laid in the mold and placed in the bag. The other is a resin induction system, where the dry fabric and mold are placed inside the bag while the vacuum pulls the resin through a small tube into the bag, then through a tube with holes or the like to evenly spread the resin throughout the fabric. A third method of constructing composite materials is known as a dry layup. Here, the carbon fiber material is already impregnated with resin (prepreg) and is applied to the mold in a similar fashion to adhesive film. The assembly is then placed in a vacuum to cure. The dry layup method has the least amount of resin waste and can achieve lighter constructions than wet layup. Frequently dry layup procedures require autoclave pressures to purge the residual gasses out. It is the dry layup method of vacuum assisted thermoforming that is the preferred method for constructing the unit base 2.

Figure 3:
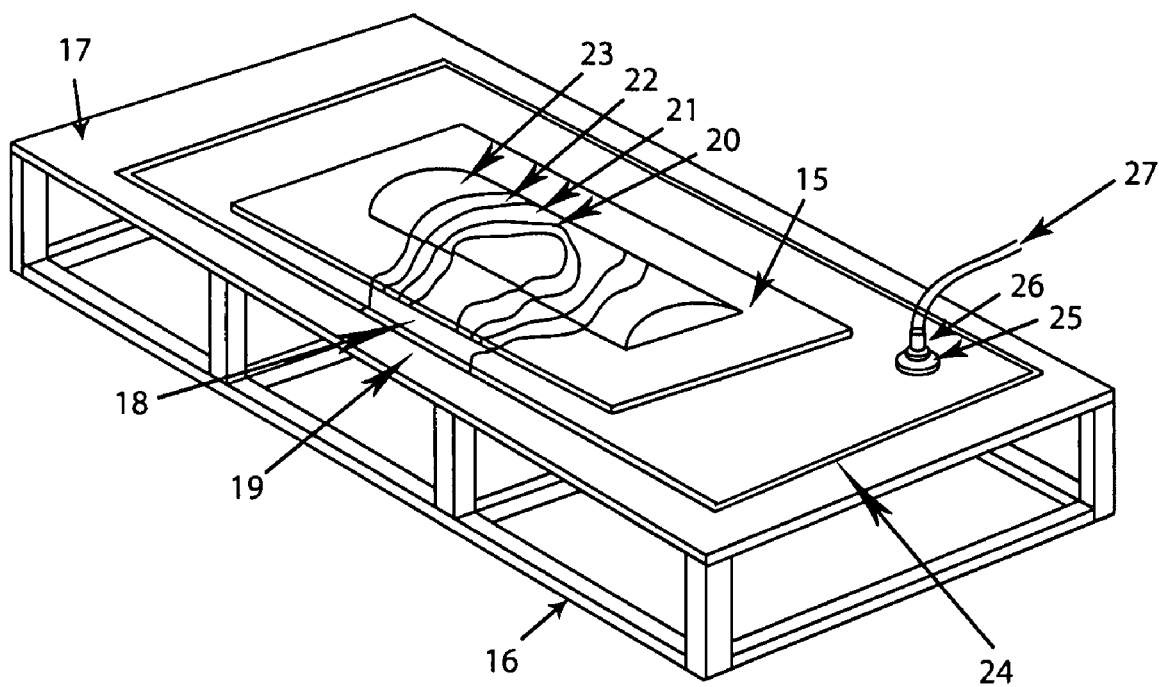
FIG. 3 is a top view of a vacuum bagging molding system.

A preferred process of manufacturing the unit base 2 comprises a vacuum bagging system as shown in FIG. 3. The composite matrix 15 consisting of the cellular load-bearing core 12 and the laminate layers of stiffening plies 13 and the final wear surface layer 14 is stabilized on a composite support structure 16. Between the composite matrix 15 and the composite support structure surface 17 is a release agent 18, such as a solid barrier of Teflon tape or like material. Bag sealant tape 19 is pressed around the edges of the release agent 18. Once the composite matrix 1S is in place, an optional peel ply 20 of tightly woven fabric, often nylon impregnated with a release agent or the like, can be applied over the composite matrix 15 to give it a textured finish if desired. Care must be taken to account for any amount or resin absorbed by the ply and reference must be made to the manufacturer's specifications to ensure the correct amount of resin is used to accommodate for the differential. On top of the peel ply 20 is placed a release film 21, typically a thin plastic that has been treated not to bond to the laminate. The release film 21 can be either a solid or perforated sheet to allow for bleed out of resin. Reference to pregreg manufacturer specification is made for recommended perforation spacing for each particular product. At least one bleeder/breather layer 22 is placed over the release film 21 to absorb excess resin and provide a continuous air path for pulling the vacuum, preventing trapped air from forming between the vacuum bagging film 23 and the composite matrix 15. The next and final layer to be placed over the composite matrix 15 is the vacuum bagging film 23, which is a relatively thick plastic layer available in a variety of conformations. The vacuum bagging film 23 is applied along the edge of the composite support structure surface 15 and is fixated by the bag sealant tape 19 forming an airtight seal. Pressure sensitive tape 24 is also placed within the confines of vacuum bagging system to assist in monitoring the pressure conditions during the curing process. Care must be taken to ensure that the vacuum pressure does not crush the composite matrix 15 or dimpling the stiffening plies 13 over the cellular load-bearing core. As stated, a curing pressure of 300 $kN/m^2$ is recommended. Incorporated into the structure of the vacuum bagging film 23 is a vacuum valve 25 which connects to a quick valve disconnect mechanism 26 at the end of an autoclave/oven hose 27.

Alternate methods of manufacturing the panel are disclosed in U.S. Pat. No. 5,569,508 and published U.S. Patent Application 2006/0008611 and are incorporated herein by reference.

Edge Component

Figure 4:
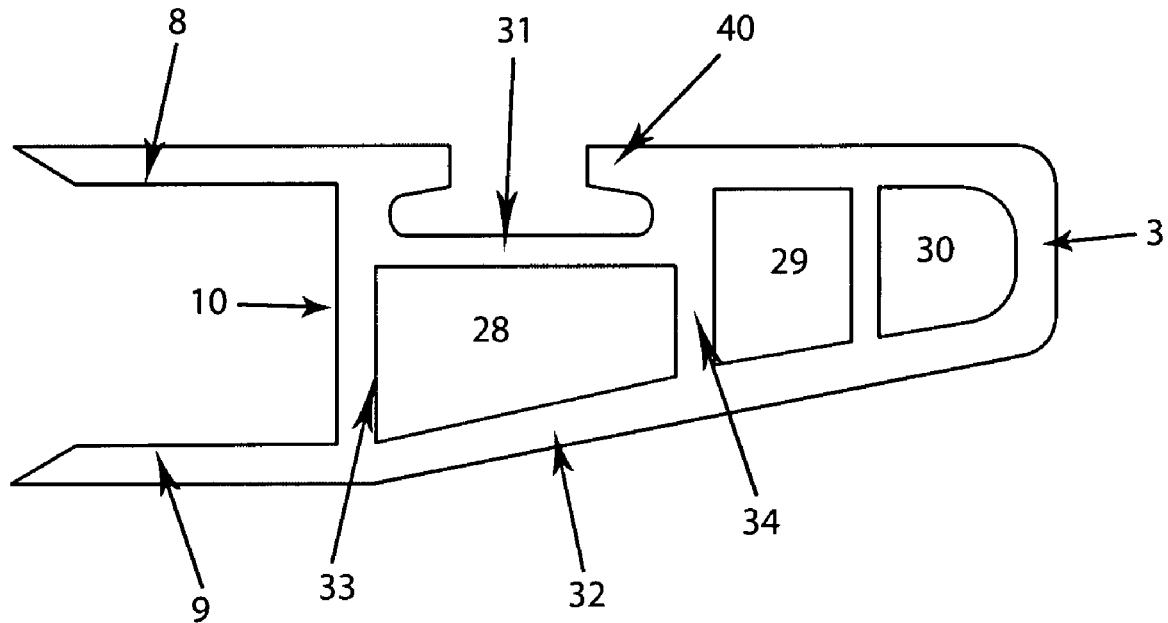
FIG. 4 is a sectional view of the open-structure lightweight edge component.

The edge component 3 as shown in FIG. 4 is a multi-chambered, open-structure lightweight material edge structure designed to allow for elastic deformation response to a variety of load conditions and related strains while introducing minimal strain at the area where the edge structure is attached to the base plate. The edge also has a secondary function to allow the unit load device I to be received by standard storage and transportation systems typically adapted with a claw hook or similar structure to retain pallets in a fixed position during transit. While the edge component 3 may be constructed from a variety of materials of appropriate strength and elasticity, the preferred material is aluminum for its strength-to-weight ratio, particularly AA-6082-T6 standard and grade aluminum.

Figure 5:
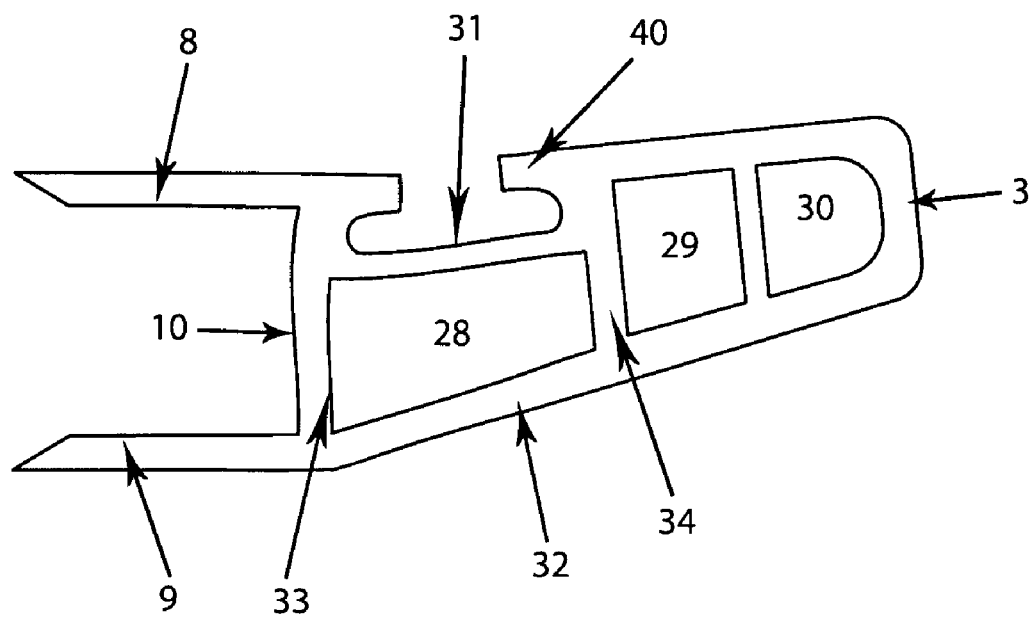
FIG. 5 is a sectional, side view of the open-structure lightweight edge component deforming under a load condition

The edge component 3 is constructed of a multi-chambered, open-structure to allow for elastic deformation under varying load conditions and to minimize the overall weight of the component. As seen in FIG. 4, the edge component 3 has two flanges 8 and 9 designed to embrace the marginal portion of the unit base 11 shown in FIGS. 1 and 2. While not required, the preferred construction of the edge component 3 comprises at least three chambers 28, 29 and 30 formed from the light material web 10 in FIGS. 1 and 4. The first chamber 28 is constructed of four connecting elements: two longitudinal elements 31, 32 running substantially parallel to the unit base 2 and flanges 8 and 9, and two transverse elements 33, 34 substantially shorter in length than the longitudinal elements 31, 32 and running substantially parallel to each other. The first chamber 28 is therefore constructed from such longer longitudinal elements 31, 32 and shorter transverse elements 33, 34 so as to form an oblong structure allowing the longitudinal elements 31, 32 to deflect along their radius of curvature in response to variable load conditions as seen in FIG. 5. The result of this design is to dissipate the strain of dynamic load conditions at the first chamber 28 thereby lessening the strain introduced at the plurality of apertures 4 in the edge component 3 whereby unit base 2 is fixed to the edge component 3 by attachment means. This design will help prevent warping and deformation of the unit base 2 and a potentially catastrophic separation of the edge component 3 from the unit base 2 which would cause dangerous shifts in the weight of the payload during transit. The, at least, second and third chambers 29 and 30 are designed to be substantially quadrate in form, providing a rigid and stable structure while incorporating weight savings by dispensing of solid material construction.

Figure 6A:
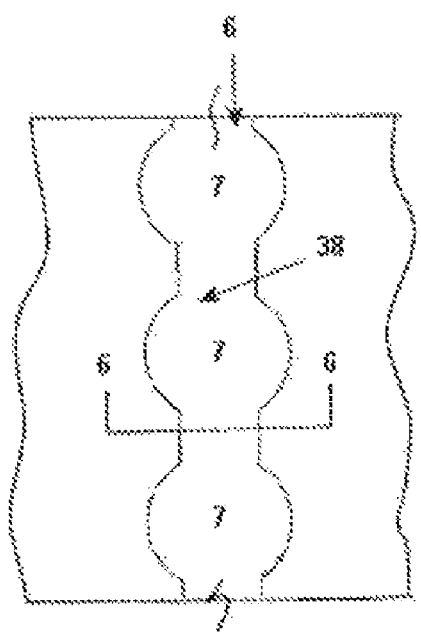
FIG. 6a is a fragmentary top view of a plurality of apertures in the open-structure lightweight edge component.
Figure 6B:
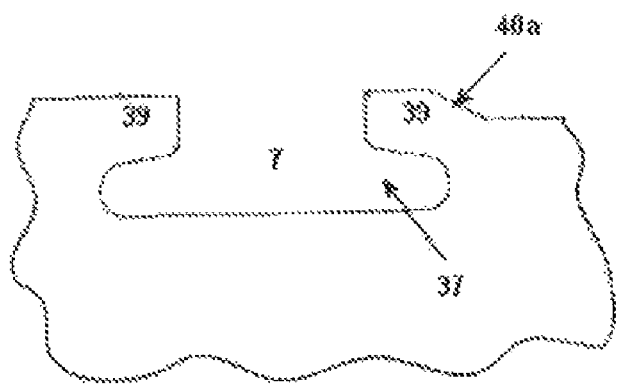
FIG. 6b is a fragmentary, sectional, side view taken along line 6-6 of FIG. 6a of a T-shaped rigging slot in the open-structure lightweight edge component.
Figure 7:
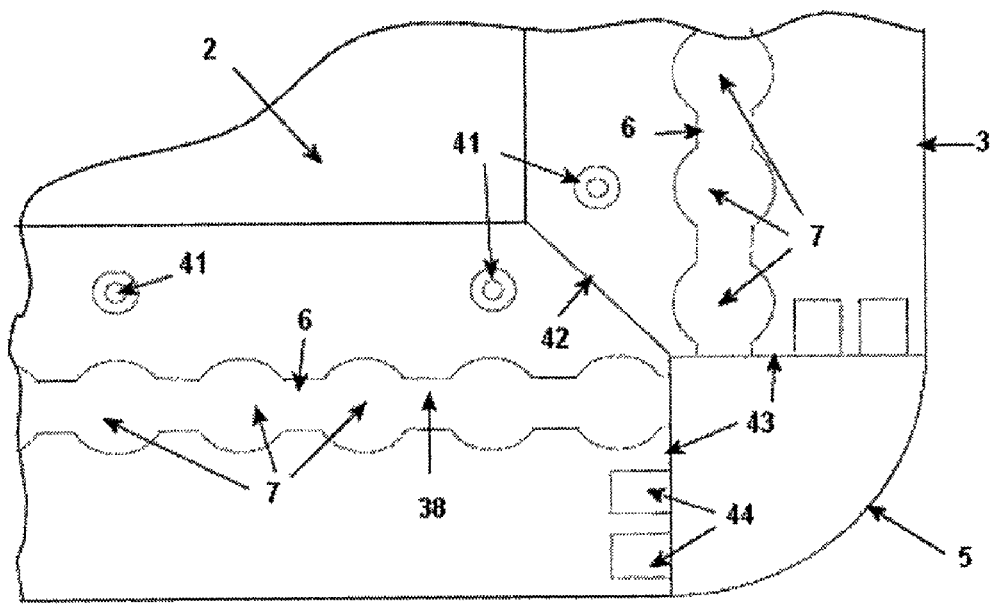
FIG. 7 is a fragmentary, top view of a corner of the unit loading device showing the edge component attached to the unit base by attachment means.

The edge component 3 is constructed so that it forms a track 6 (shown in FIGS. 1, 6a and 7) that contains a plurality of T-shaped apertures 7 (shown in FIGS. 1, 6b and 8) designed to accept an anchoring element 35 as seen in FIG. 8. The track 6 is structured, dimensioned and configured to accommodate the removable but fixed retention of an anchoring element 35 secured to and/or associated with a load retaining structure 36 that is maintained in a retaining relation to any load supported on the unit base 2 as shown on FIG. 8. As can be appreciated, the apertures 7 and/or other structure at which the load retaining structure is secured may include a variety of different configurations, and may be defined only at fixed points rather than as a continuous elongate structure. The construction of the track 6 in the preferred embodiment, however, comprises an at least partially hollow interior portion 37 as seen in FIG. 6b and a centrally disposed channel 38 in FIGS. 6a and 7, which communicates directly with a plurality of spaced apart apertures 7. FIG. 7 shows that the channel 38 may extend partially or completely along a length of the track 6 and ending at the corner section 5, thereby reducing the overall weight of the edge component 3. Each of the apertures 7 are separated, as seen in FIG. 6b, by a narrowed portion 39 having a lesser transverse dimension than the diameter or equivalent transverse dimension of the plurality of apertures 7. The narrowed portion 39 operates to prevent upward movement of the anchoring element 35 of FIG. 8 relative to the unit base 2. In one embodiment of the invention, the narrowed portion 39 more distal to the unit base 2 may be constructed in a manner that its top surface 40 is flush with the plane of the upper flange 8 as referenced in FIG. 4. In an alternate embodiment shown in FIG. 6b, the narrowed portion 39 more distal the unit base 2 may be constructed in a manner such that the distal upper surface 40a of said narrowed portion is set in a substantially downward angle relative to the plane of the unit base 2, thereby allowing for a slight tilt in the transfer of payload from the edge of the unit loading device for employing the assistance of gravity.

As seen in FIG. 7, the edge component 3 is attached to the unit base 2 by attachment means, preferably a flush head rivet 41, so as to present a flat top profile. An exemplary rivet would be a Cherry Maxibolt sold as part number CR7620S 05-03 by Dejond Nev. (Antwerpen, BE).

In the preferred embodiment, the inside end 42 of the edge component 3 is mitered at an angle 45 degrees with the respect to the length of the edge component 3 and positioned flush up against the intersecting end of a transverse edge component 3 as shown in FIG. 7. The outside end 43 of the edge component 3 is cut in a plane 90 degrees to the length of the edge component 3 allowing for the fitted protruding elements 44 of the corner section component 5 to access the second and third chambers (29 and 30 of FIG. 4) of the edge component 3.

Corner Section Component

FIGS. 9a and 9b show the side and top views of the corner section component 5, with associated fitted protruding ends 44 designed to be inserted into the second and third chambers 29, 30 of the edge component 3. The corner section component 5 may be constructed of a variety of materials, but preferably of a heavy rubber or plastic or rubberized metal or composite structure so that the compressible quality of the outer surface will allow the fitted protruding ends 44 to be manufactured to dimensions slightly larger than that of the second and third chambers 29, 30 allowing for a playfree fit between the corner section component 5 and the two abutting edge components 3 as shown on FIG. 7. The purpose of the corner section component 5 is to absorb shearing forces that would vertically displace the abutting edge components 3 with respect to each other along the miter joint plane.

While a specific embodiment of the invention has been shown and described in detail to illustrate the application of the principles of the invention, it will be understood that the invention may be embodied otherwise without departing from such principles.

What is claimed is:
1. An ultralight unit load device, comprising:
a broad composite base panel having first and second faces and a peripheral surface;
an open-structured edge component extending along a substantial portion of said peripheral surface, said edge component comprising an upper longitudinal element and a lower longitudinal element both extending parallel to the base panel and spaced from each other, and two spaced apart transverse elements extending transversely to and connected to the longitudinal elements for defining a first chamber next to the composite base panel that extends along the edge component, the longitudinal elements being longer than said transverse elements, the edge component further comprising additional elements defining two additional chambers extending one after the other and next to the first chamber and being spaced from the base panel, the elements defining the chambers all being of lightweight material, said edge component including first and second spaced flanges substantially parallel to one another, said first and second flanges interconnected by a web to form a receiving area for mounting a marginal portion of said base panel, said edge component presenting a substantially flat top profile set flush with the said first and second faces of said base panel;
attachments means for attaching said edge component to said marginal portion of said base panel; and
a corner section component of lightweight material having fitted end protrusions for engaging said chambers of said edge component for absorbing shear forces.

2. The unit load device of claim 1 wherein said composite base panel comprises a load-bearing cellular core.

3. The unit load device of claim 2 wherein said cellular core is aluminum honeycomb.

4. The unit load device of claim 3 wherein the aluminum honeycomb is microperforated.

5. The unit load device of claim 4 wherein the aluminum honeycomb is made of aluminum that is 5056 H3 aluminum Alloy, with ⅛ inch cores and a density range from 1 to 9.2 lb/cf.

6. The unit load device of claim 2, wherein said composite base panel has a maximum thickness of 1 inch, and said load-bearing cellular core is microperforated 5056 H3 aluminum alloy with ⅛ inch cores, and a density of 9.1 lb/cf.

7. The unit load device of claim 2 wherein said cellular core is made from a material selected from the group consisting of aramid paper honeycomb, carbon fiber honeycomb and glass fiber composite honeycomb.

8. The unit load device of claim 2 wherein said composite base panel comprises at least one ply of unidirectional ordered-polymer fabric placed in different directions for each successive ply.

9. The unit load device of claim 8 wherein said unidirectional ordered-polymer fabric is carbon fiber pre-impregnated with epoxy resin.

10. The unit load device of claim 9 where the density of said carbon fiber is between 184 and 232 g/m2 and the density of said epoxy resin is between 79 and 99 g/m2 whereby the overall density of said unidirectional ordered-polymer fabric is between 263 and 331 g/m2 and the overall thickness of said unidirectional ordered-polymer fabric is between 0.166 to 0.211 mm.

11. The unit load device of claim 8 wherein said unidirectional ordered-polymer fabric is fiber selected from the group consisting of aramid, ceramic and boron.

12. The unit load device of claim 8 wherein said composite base panel comprises at least one final wear layer.

13. The unit load device of claim 12 wherein the at least one final wear layer is aramid prepreg fabric with a density of 171 g/m2.

14. The unit load device of claim 13 wherein said composite base panel comprises of at least one layer of adhesive film said adhesive film having an areal weight between 0.03 and 0.08 psf.

15. The unit load device of claim 1 wherein said lightweight material is aluminum.

16. The unit load device of claim 15 wherein the standard and grade of the aluminum is AA-6082-T6.

17. The unit load device edge of claim 1 wherein the said open-structure comprises a track on the upper longitudinal element composed of a channel which communicates directly with a plurality of apertures for holding anchoring elements, said anchoring elements having a head portion shaped to retained in said apertures and said anchoring elements being longitudinally slidable along said track and insertable or removable from said track.

18. The unit load device of claim 17 wherein said apertures have a narrowed portion for retaining said anchoring elements, said narrowed portion comprising of a proximate and a distal edge, the upper surface of said distal edge being set in a downward angle relative to the plane of said first face of said base panel.

19. The unit load device of claim 1 where said attachment means is a flush head rivet.

20. The unit load device of claim 1 wherein said lightweight material of the corner section is rubberized.

21. An ultralight unit load device, which comprises:

a broad microperforated aluminum honeycomb core composite base panel with a thickness of 1 inch, said composite base panel comprised of at least one adhesive layer, said composite base panel comprised of at least one stiffening layer of unidirectional carbon-fiber prepreg placed in successive alternate directions, said composite base panel comprised of at least one final aramid wear layer, said composite base panel having first and second faces and a peripheral surface;

an open-structured edge aluminum component extending along a substantial portion of said peripheral surface, said edge component comprising an upper longitudinal element and a lower longitudinal element both extending parallel to the base panel and spaced from each other, and two spaced apart transverse elements extending transversely to and connected to the longitudinal elements for defining a first chamber next to the composite base panel that extends along the edge component, the longitudinal elements being longer than said transverse elements, the edge component further comprising additional elements defining two additional chambers extending one after the other and next to the first chamber and being spaced from the base panel, said edge component including first and second spaced flanges substantially parallel to one another, said first and second flanges interconnected by a web to form a receiving area for mounting a marginal portion of said base panel, said edge component presenting a substantially flat top profile set flush with the said first and second faces of said base panel, said at least three chambers having two longitudinal elements and two traverse elements, one of said at least three chambers having said two longitudinal elements substantially longer than said two traverse elements, said edge component having a track composed of a channel which communicates directly with a plurality of apertures for holding anchoring elements, said anchoring elements having a head portion shaped to retained in said apertures and said anchoring elements being longitudinally slidable along said track and insertable or removable from said track;

a flush head attachments means for attaching said edge component to said marginal portion of said base panel; and a corner section component of lightweight material having fitted end protrusions for engaging said chambers of said edge component for absorbing shear forces.

* * * * *